Dec. 18, 1962     I. M. JACOBS     3,069,339
NUCLEAR FUEL ELEMENT LEAK DETECTOR
Filed Aug. 13, 1958     3 Sheets-Sheet 1
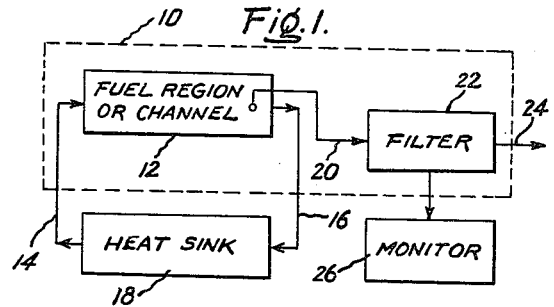
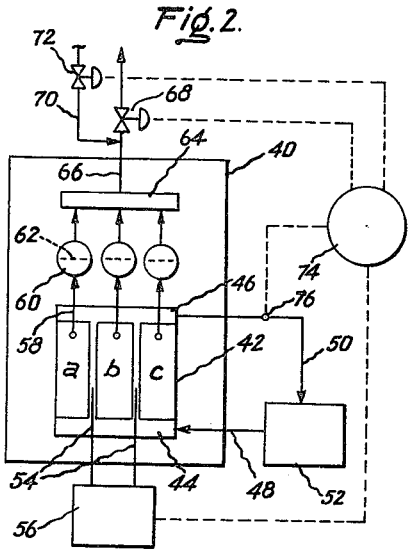
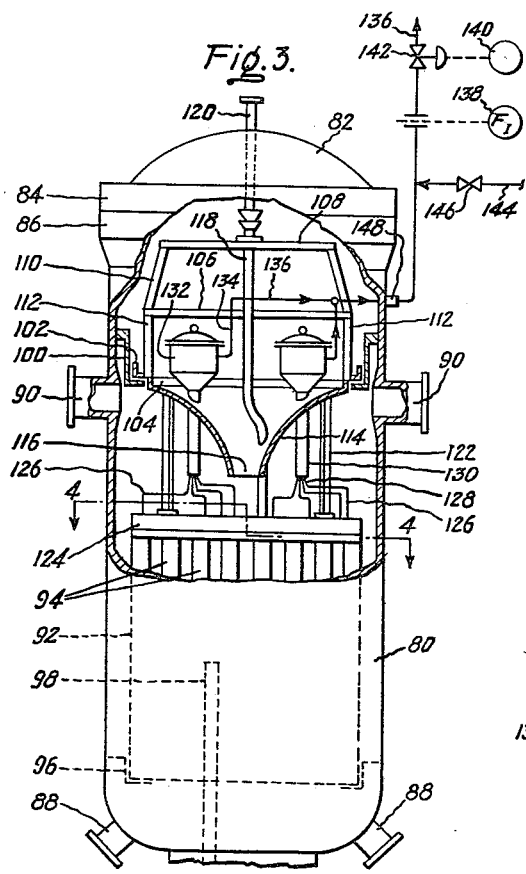
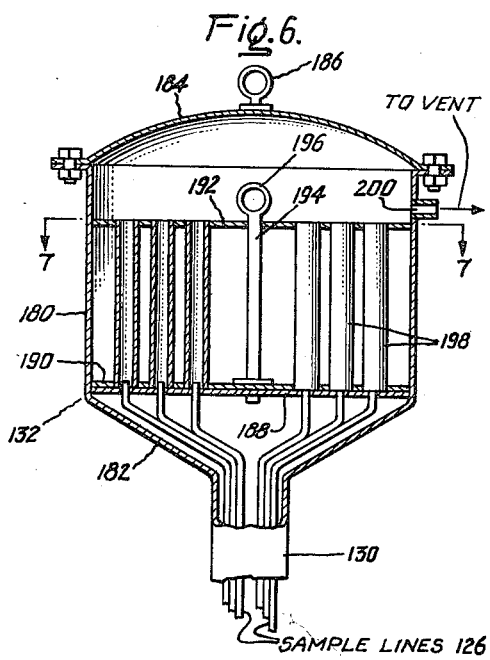
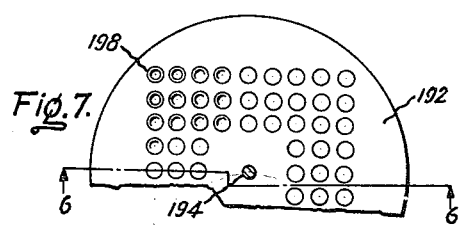
INVENTOR.
IVAN M. JACOBS,
BY
ATTORNEY

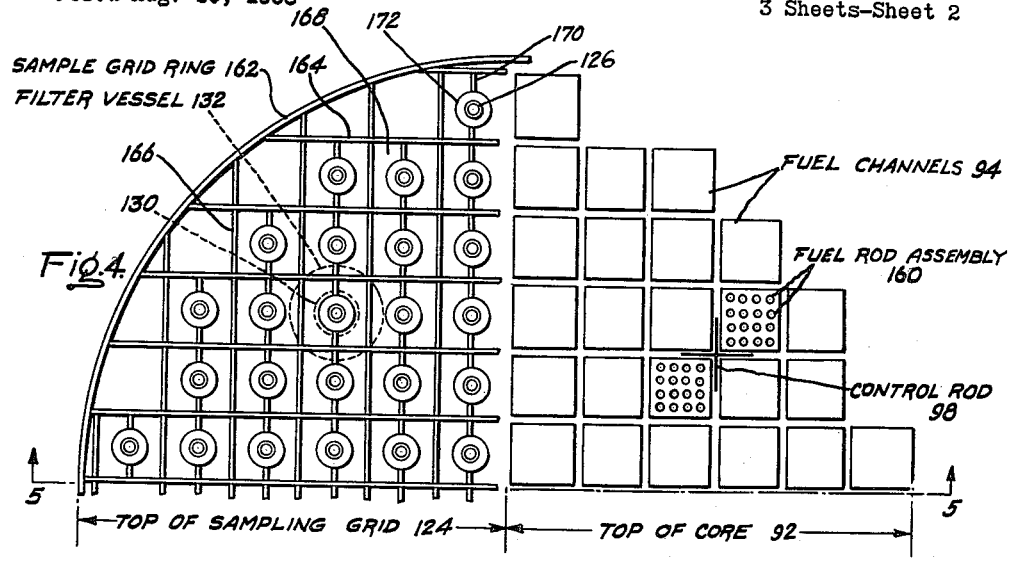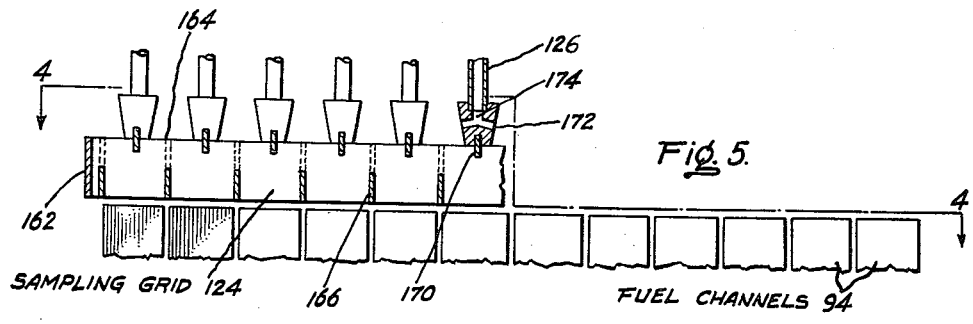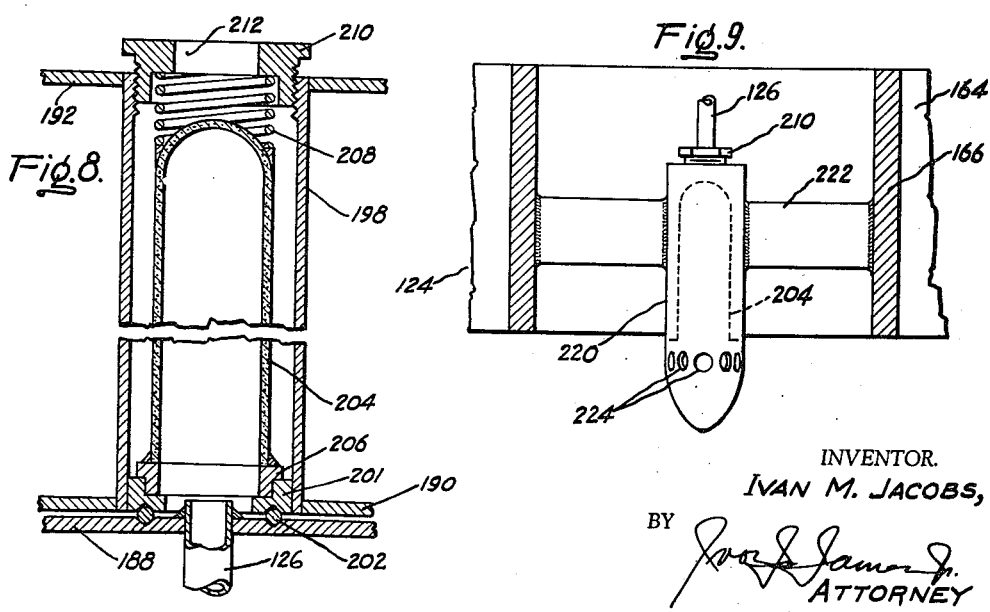

Dec. 18, 1962  I. M. JACOBS  3,069,339
NUCLEAR FUEL ELEMENT LEAK DETECTOR
Filed Aug. 13, 1958  3 Sheets-Sheet 3
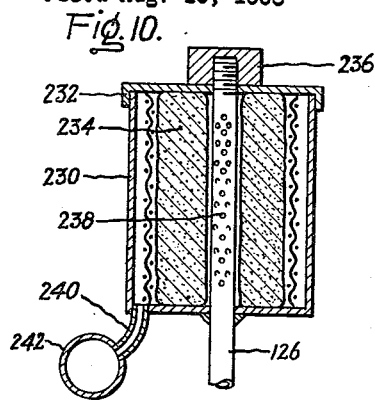
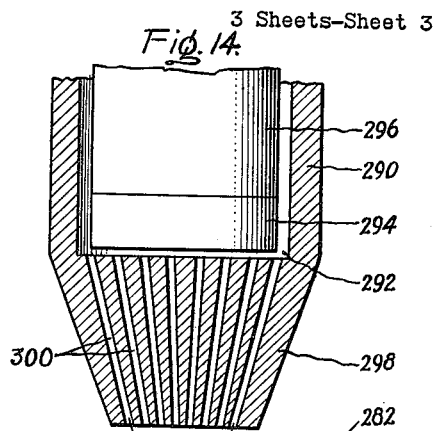
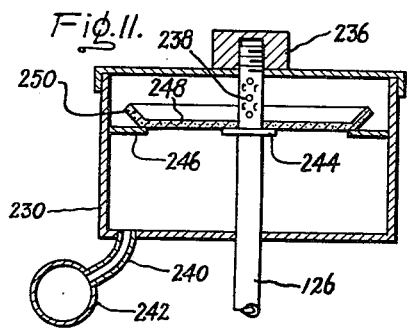
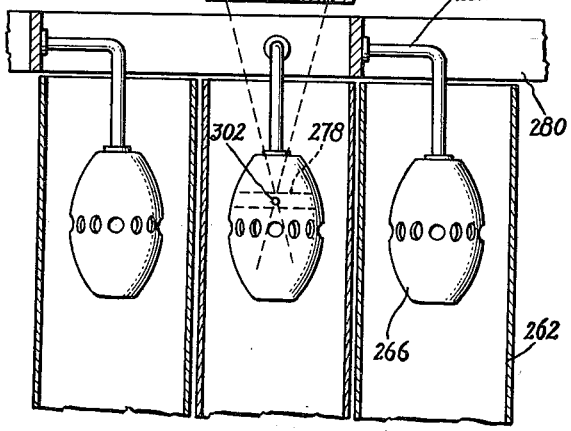
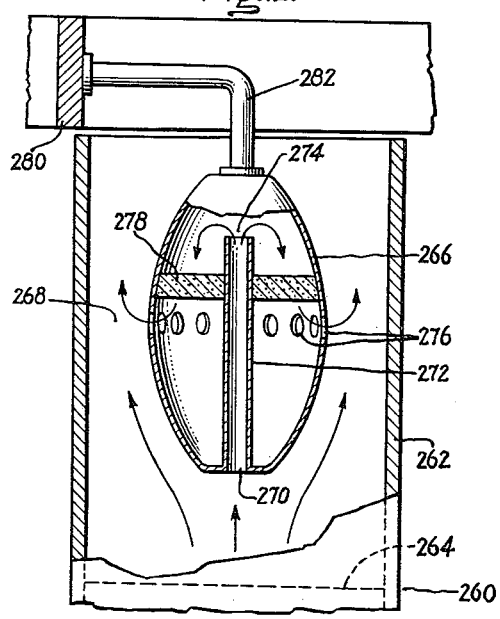
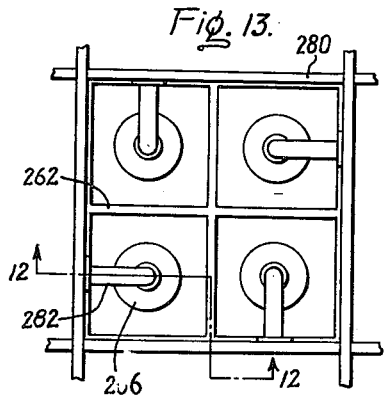
INVENTOR.
IVAN M. JACOBS,
BY
ATTORNEY 3,069,339
NUCLEAR FUEL ELEMENT LEAK DETECTOR
Ivan M. Jacobs, San Jose, Calif., assignor to General
Electric Company, a corporation of New York
Filed Aug. 13, 1958, Ser. No. 754,861
5 Claims. (Cl. 204—154.2)

This invention relates to the liberation of energy in nuclear reactors, and it relates more particularly to an improved method and apparatus for the detection of the existence and identity of leaking fuel elements in such reactors, as in high neutron flux test and power reactors.

The release of large amounts of energy through nuclear fission reactions is now quite well known. In general, a fissionable atom such as $U^{233}$, $U^{235}$, or $Pu^{239}$ absorbs a neutron in its nucleus and undergoes a nuclear disintegration. This produces on the average, two fission products of lower atomic weight and great kinetic energy, and from 2 to 3 neutrons also of high energy. For example, the fission of $U^{235}$ produces a light fission product and a heavy fission product with mass numbers ranging between 80 and 110 between 125 and 155 respectively, and an average of 2.5 neutrons. The energy release approaches about 200 mev. (million electron volts) per fission.

The kinetic energy of the fission products is quickly dissipated in ambient material as heat. If after this heat generation there is at least one net neutron remaining which induces a subsequent fission, the fission reaction becomes self-sustaining and the heat generation is continuous. The heat is removed by recirculating a coolant through heat exchange relationship with the fissionable material and a heat sink. The reaction may be continued as long as sufficient fissionable material remains in the system, considering the effects of the fission products which also may be present.

In order to maintain such fission reactions at a rate sufficient to generate commercial quantities of thermal energy, nuclear reactors are presently being designed, constructed, and operated in which the fissionable material or nuclear fuel is contained in fuel elements which may have various shapes, such as plates, tubes, or rods. These fuel elements are usually provided with a corrosion resistant non-reactive cladding on their external surfaces and which contains no fissionable or fertile material. The elements are grouped together at fixed distances from each other in a coolant flow channel or region as a fuel assembly, and sufficient fuel assemblies are combined to form the nuclear reactor core capable of the self-sustained fission reaction referred to above. The core is enclosed within a reactor vessel through which a coolant is circulated.

The cladding serves two primary purposes; first, to resist any chemical reaction between the nuclear fuel and either the coolant or moderator if present, and second, to prevent the highly radioactive fission products from being released into the coolant or moderator or both. Common cladding materials are stainless steel, aluminum and its alloys, zirconium and its alloys, and others. The failure of the cladding can contaminate the coolant or moderator and the coolant system with intensely radioactive long-lived products to a degree which interferes with plant operation. Detection and replacement of the defective fuel element are thus desirable before a major clad rupture and such contamination occur.

Conventionally, the gross activity of the reactor coolant or the off gas in the system is monitored during operation, and this readily indicates by an abrupt activity rise the occurrence of a cladding leak somewhere in the reactor core. In such case the reactor is normally shut down before excessive coolant contamination occurs. The gross activity monitoring system does not, however, indicate which one or more of the perhaps many hundreds of fuel assemblies are defective and leaking.

The identification of the particular fuel element or elements which are defective has been accomplished in the past by continuously or intermittently sampling the effluent coolant from each fuel assembly or channel in the reactor, or from groups of such assemblies, and continuously or intermittently monitoring the radioactivity of each individual sample in a sample room located away from the reactor. This procedure, however, requires either the penetration of the reactor vessel by a large number of sample lines, or the use of valve manifolds or mechanically complex remotely-operated multi-port valves located inside the vessel, and which successively sample the effluent coolant from the various channels.

It is accordingly, a primary object of this invention to overcome the foregoing disadvantages and provide an improved process and apparatus for detection of the existence and identity of defective and leaking fuel elements in a nuclear reactor core.

It is a further object to provide for the monitoring of the radioactivity of the effluent coolant from each fuel assembly or channel in a nuclear reactor without plural penetrations of the reactor vessel and without complex valving.

An additional object is to provide a leaking fuel element detection system which effectively "integrates" the leakage of radioactive materials from the defective fuel element over a period of time and enhances the efficiency of detection.

Other objects and advantages of this invention will become apparent to those skilled in the art as the description and illustration thereof proceed.

Briefly, the present invention comprises an improved process and apparatus for detecting the existence of and identifying defective and leaking fuel elements in nuclear reactors including the steps of and means for withdrawing a sample of fluid flowing adjacent a given fuel element and containing any radioactive fuel and fission product particles discharging from a defective fuel element, passing at least part of the sample through contact with a body of solid filter material to filter at least part of the particulate material from the sample stream and subsequently monitoring the partially spent filter material to determine the presence thereon of radioactive materials. When the fluid is a boiling coolant, the sample may be separated into a vapor and a liquid phase, and the liquid phase passed alone through the filter; or the mixed phases may be filtered. When the fluid is a non-boiling coolant, that is, one which remains in the vapor or liquid phase in the nuclear system, a small fraction is separated from the main stream and is passed through the filter. If no particulate radioactive materials are leaking into the fluid the filter reactivity will have a relatively low background value, but it will be anomalously high when the fuel element is defective and leakage is occurring. In large systems where plural fuel channels or regions are employed, plural samples are taken, one from each channel, an individual filter element is used to treat each sample, and an anomalously radioactive filter element indicates the existence of and identifies the channel or region containing the leaking fuel element as the one from which the sample contacting that filter was taken. In this way even minute leaks are located prior to the time they become major ruptures.

After reactor shutdown, due to a fuel element leak as may be shown by a gross coolant activity rise, or in the normal course of refueling, the individual filter elements are removed to a monitoring station. If anomalously high activity is detected on a given filter element, it will indicate the channel, group of channels, or region in which the leak or leaks have occurred. Replacement fuel elements or assemblies are thus quickly and efficiently substituted for the defective ones.

Although a major rupture may occasionally occur and will effect a relatively large increase in gross coolant radioactivity indicating the necessity of an immediate reactor shutdown, more commonly the cladding leaks will be tiny fissures through which radioactive particles leak slowly and will not be sufficient to require an immediate shutdown. Leakage of these materials from such fissures continues at varying rates, and due to thermal cycling of the reactor during normal operation these fissures may gradually open up until ultimately a gross escape of radioactive fuel and fission products from a major rupture could occur.

The collection of radioactive particulate matter according to this invention permits detection and identification of leaking fuel assemblies while the leaks are still in this fissure stage, and before gross escape occurs. This is due in part, to the integrating effect of collecting, over an extended operating period, the radioactive materials which may be escaping at a very low rate through the tiny fissures in the clad. This rate is frequently so low that it cannot be detected as gross activity in the coolant stream. By removal of the filter elements from the reactor at each scheduled shutdown and by monitoring each element, the existence of these ruptures can be detected well in advance of the time they would open up and become serious. The defective fuel assembly is replaced with a new one and operation continues. This procedure reduces significantly the number of unscheduled shutdowns due to major breaks in fuel elements.

The present invention, including the process operation and several embodiments of the invention in specific apparatus structure, will be described in greater detail and will be more readily understood by those skilled in the art through reference to the accompanying drawings in which:

FIGURE 1 is a schematic block diagram showing the general operations of the process of this invention, FIGURE 2 is a schematic diagram showing the present invention applied to a nuclear reactor having several fuel channels through which a coolant is recirculated, FIGURE 3 is an elevation view in partial cross section of a typical nuclear reactor vessel showing the location of the coolant sampling points and the filter element holder vessel above or apart from the reactor core flow channels, FIGURE 4 is a split plan view of FIGURE 3 showing in the northeast quadrant the top of the reactor core with its fuel element assemblies and flow channels, control rods, and fuel elements, and showing in the northwest quadrant the top of the sampling grid and the location of one of the four filter holder vessels, FIGURE 5 is an elevation view of FIGURE 4 showing the upper end of the reactor core, the sampling grid, and the attachment means for securing the lower ends of the sample lines in the sampling grid, FIGURE 6 is an enlarged detail view in partial cross section showing the detail of the filter holder vessel indicated in FIGURES 3 and 4 and containing a removable filter element holder and the individual filter elements, FIGURE 7 is a plan view of the filter holder vessel shown in FIGURE 6, FIGURE 8 is an elevation view in cross section of a typical individual filter element suitable for use in the reactor detailed in FIGURES 3–7, FIGURE 9 is an elevation view in cross section of another embodiment of this invention in which the individual filter elements are disposed directly in the sampling grid, FIGURES 10 and 11 are views of two other kinds of filter elements suitable for use in various kinds of coolants, FIGURES 12 and 13 are views of still another embodiment of this invention in which flow of coolant through the filter element is induced by the coolant flow through the individual fuel channels in the reactor core, and FIGURE 14 shows the application of a shielded and focused spectrophotometer to the individual monitoring of fuel elements in a grid.

Referring now more particularly to FIGURE 1, a schematic diagram showing the process steps of this invention is presented. The bounds of the reactor vessel are indicated at 10 and contains fuel channel or fuel region 12. Coolant enters and leaves the vessel 10 by means of lines 14 and 16. The heated coolant is circulated through heat sink 18 where the heat is removed. The heat sink may be a heat exchanger, a turbine and condenser system, or both, or other known heat using device. A sample of the coolant is taken adjacent the effluent point from fuel region 12 by means of line 20 and passed into filter element holder 22. The filtered coolant may be returned by line 24 to any convenient place in the coolant cycle. The particulate material, containing any radioactive fuel or fission product particles, is retained on the filter element while the filtrate flows on through line 24.

The filter element is moved from filter zone 22 to monitor zone 26 which includes radioactivity sensing-counter-detector-amplifier-recorder equipment. The function here is to detect and record the radio-activities of individual filter elements in groups or in sequence and distinguish those which have anomalously high activities. This serves to identify and locate a defective fuel channel or region. It should be understood that FIGURE 1 merely illustrates the process as applied to a single fuel assembly or fuel region through which a stream of coolant flows, and that in actual practice the many hundreds of individual fuel assemblies or fuel regions in a large nuclear reactor are each similarly sampled and monitored. The monitoring by measurement of the radiation from the filter element may be done a considerable time after reactor shutdown.

FIGURE 2 is another schematic diagram showing the general physical relationship of some of the various zones referred to in FIGURE 1. Nuclear reactor vessel 40 containing reactor core 42 is illustrated as containing three representative fuel channels or regions $a$, $b$, and $c$. The core is provided with coolant inlet and outlet headers 44 and 46 connected respectively with inlet and outlet lines 48 and 50, communicating with suitable coolant circulation and heat sink equipment designated generally as 52. The reactor core is further provided with control rods 54 positioned by control rod drive mechanism 56, the rods being extendable into and out of the core.

The coolant samples are taken just upstream from the coolant outlet opening of each fuel channel and prior to gross mixing of the channel effluents with each other in outlet header and line 46 and 50 respectively. The sample from channel "$a$" for example, passes through sample line 58 through a communicating sample filter chamber 60 containing filter element 62. The filtrates from all such channels discharge into a common sample header or manifold 64 from which the fluid is vented through line 66 controlled by valve 68 to any convenient region of lower pressure, such as part of the coolant system, a condenser, a blower or pump not shown, or the like. Purge line 70 controlled by valve 72 opens into line 66 and is used to reverse flush the sample lines and filter elements clear when necessary.

Gross coolant monitor-controller 74 is provided, connected to be responsive to a predetermined rise or level in gross coolant radio-activity. Several modes of operation are permitted.

In one mode, valve 72 is normally open and a controlled back flow of clean coolant fluid or fluid compatible with the coolant, is introduced in the reverse direction through the sampling system preventing sample filtration. Valve 68 is normally closed. Upon detection of a predetermined level or rise in gross coolant radioactivity, controller 74 closes valve 72 stopping the back flow and opens valve 68 permitting sampling to begin. Sample filtration continues for a short period sufficient to filter out particles liberated from the defective fuel channel or channels into the coolant and partially saturate the filter element in the defective channel. In cases of severe or multiple ruptures, this period may be equal to or less than the time necessary for the gross coolant to flow from the detection point 76 through the coolant recirculation system to the sampling points. Longer periods may be used with less serious ruptures. At the end of the sampling period, controller 74 activates control rod drive mechanism 56 driving rods 54 into the core shutting down the reactor. The filter elements 62 are then removed and monitored in any convenient way as hereinbelow-described to identify the defective channel.

In another mode of operation, valve 72 is normally closed and valve 68 is normally open sufficiently to permit a small controlled flow of coolant sample to be taken through each filter from its corresponding fuel channel. At a regularly scheduled reactor shutdown, as for refueling, controller 74 closes valve 68 and shuts the reactor down as before. If desired, by opening valve 72 a very small back flow of clean coolant may be admitted at a rate insufficient to dislodge particles from the filters, but sufficient to prevent diffusion of contaminated gross coolant into contact with the filter elements which might adversely affect the signal to background ratio. The filter elements are monitored either after removal from the reactor or in place, and an anomalously high filter activity identifies the defective and leaking fuel channels.

In either case, the filter elements 62 are selected upon a consideration of their physical characteristics, the sample flow rates, and the filtration time so that they do not become fully saturated with particulate material from the samples treated. In other words, the sample filtration system is constructed and operated so that upon reactor shutdown and removal of the filter elements from the reactor, even those filters which treat coolant samples from the defective fuel channels are not fully saturated and still retain excess filtration capacity.

Clearly from the foregoing description of FIGURE 2, care is taken to maintain a substantial signal to background ratio in the system by avoiding operation following an indicated fuel channel rupture for a period long enough to saturate any or all the filters with contaminated coolant for example.

The interference or background signal, normally encountered due to the presence of activated corrosion or erosion products or of fuel and fission products circulating with the coolant, is minimized or eliminated by continuous purification of the gross coolant flow. In the case of water cooled reactors, this is done by coolant demineralization, filtration, or both. In reactors cooled with liquid metals, the usual metal purification techniques are used. In reactors cooled with organic liquids, such as terphenyl and the like, techniques such as filtration or distillation or both may be used. In gas cooled reactors, the gas coolant may be similarly purified by filtration, settling, centrifugal separation, or electrostatic precipitation. Other purification procedures will occur to those skilled in the art and are effected in zone 52 shown in FIGURE 2. Such procedure aids in further reduction of the background radioactivity signal, which is usually on the order of 1/nth that generated by a filter sampling coolant from a leaking fuel channel. This is due to the effect of uncontaminated coolant discharging from $n-1$ non-leaking channels and which mixes with and dilutes the contaminated coolant discharging from one defective channel. This dilution occurs during passage of the gross coolant flow through the coolant path connecting the reactor coolant outlet with its inlet. Although a greater number of defective channels will tend to bring the signal to background ratio down, the continuous coolant purification procedures tend to raise this ratio, and thus counteract the effect.

Referring now to FIGURE 3, an elevation view in partial cross section of a typical high pressure commercial scale nuclear power reactor vessel 80 is shown provided with a removable upper head 82 and head flanges 84 and 86. Coolant inlets 88 enter the vessel at the lower end, and coolant outlets 90 are provided somewhat above the mid-height of the vessel. The reactor core 92, consisting of a plurality of vertically disposed, parallel, fuel assembly and flow channels or regions 94, is supported in the vessel by means of support 96. The channels or regions are open at top and bottom to permit coolant flow therethrough, and each channel surrounds or includes a bundle of individual nuclear fuel elements as shown in FIGURE 4. A typical control rod is indicated generally at 98 and extends into the core to permit variation in the rate of heat generation.

Disposed peripherally around the inner wall of vessel 80 is a support means 100, here shown as a ring of L-shaped cross section forming a support shelf. Supported on this shelf by means of support element 102 is a removable structural cage-like assembly consisting of lower ring 104, middle ring 106, and upper ring 108 spaced vertically apart from one another and connected by vertical members 110 and 112. Suspended from the lower ring 104 is an upwardly flaring coolant turning vane 114 having lower open end 116 and serving to deflect heated coolant, flowing from core 92, laterally toward the several coolant outlet nozzles 90. As shown in the drawing, the upper outer periphery of the turning vane lies just above the outlet nozzles. A typical instrument line 118 for in-core instrumentation extends vertically from the top of core 92 to the top part of the removable assembly, where it joins line 120 attached to and extending through vessel head 82. Suspended from lower ring 104 by means of support member 122 is sampling and core hold-down grid 124 located just above the upper surface of reactor core 92. The heated coolant passes upwardly through sampling grid 124 and coolant samples are taken continuously from the effluent of each flow channel before these effluents mix with each other above the core. The plan views of both the reactor core 92 and grid 124 are shown in FIGURE 4 subsequently described.

From the various sampling points in grid 124, sample lines 126 pass upwardly into bundles 128, enclosed by sample line protector tube 130, and enter the filter element vessel 132. The structure of these vessels, their contents, their number, and their disposition through the vessel cross section are all shown more clearly in FIGURES 4 to 8, described below.

Vent line 134 opens from each filter element vessel 132 through header 136 and discharges to a low pressure region of the coolant recirculation system. Although this low pressure point may be in the reactor vessel dome itself, it is shown in FIGURE 3 external to the reactor vessel. Flow indicator 138, controller 140 and valve 142, and purge inlet 144 and valve 146 are all provided for vent line 136. By means of controller 140, depending upon the mode of detector operation, the sample flow is either started upon a predetermined signal during reactor operation, or is maintained continuously and is controlled at a proper rate in relation to the volume of the sampling and filtration system so that substantially equal flow rates of coolant samples are maintained through each individual filter element, and so that at no time does a filter treating the effluent sample from a leaking fuel channel become saturated with radioactive particulate matter. It should be noted that no complex valves are required, and that only a single vent line 136 penetrates reactor vessel 80 at point 148.

In FIGURE 4 a split plan view is presented showing the northwest quadrant of the sampling grid 124 and the northeast quadrant of the top of the reactor core 92. Elements also shown in FIGURE 3 are here designated by the same numerals. In the northeast quadrant are shown square fuel channels 94, each containing an assembly of fuel elements 169, and control rod 98 having a cruciform cross section operating between four adjacent channels. In the northwest quadrant, the sampling grid 124 is shown in detail. It is contained within a circular grid ring 162 which serves as the end support for a system of east-west rib members 164 and north-south rib members 166, intersecting at right angles forming an egg-crate type grid. The spacing is such as to form a plurality of square sample openings or cells 168 corresponding to and aligned with the end of each of the fuel channels. Extending across the center of each sample cell 168 is a sampling tube support member 170 which serves to locate the anchor 172 of the intake end of the sample line, and any sample separator which may be required, in the center or any other selected position of the fuel channel effluent. The location of one of the filter vessels 132 is shown together with its sample line protector tube 130.

In the large reactor system specifically illustrated here, there are 488 fuel channels or regions. The equal number of samples which must be filtered through individual filter elements dictates that they preferably be located as shown in FIGURES 3 and 4. Thus, four groups of 122 filter elements each are disposed in individual holder vessels as shown, one in each quadrant of the reactor vessel cross section. Other multiples of filter vessels may be used for larger or smaller numbers of fuel regions or channels.

Referring now to FIGURE 5, which is an elevation view of FIGURE 4 taken as indicated, the top of the several fuel channels 94 and the sampling grid 124 are shown. The intersecting members 164 and 166 of the grid are supported at their ends by grid ring 162. The lower ends of the sample lines 126 extend down to anchor 172 which is provided with an opening 174 therethrough as a part of the sample flow path. The anchor 172 is supported in each sample cell by support member 170. The alignment between the upper end of each fuel channel and the opening or sample cell in the egg-crate sample grid is clearly shown.

Referring now to FIGURES 6 and 7, a detail cross section elevation view of the filter element holder vessel 132 shown generally in FIGURE 3, and a partial plan view, are shown respectively. The vessel 132 is formed of the central cylindrical section 180, a lower conical transition section 182 connected to the top of sample line protector tube 130 surrounding sample lines 126, and is provided with an upper removable head 184 and lift ring 186. A holder support plate 188 is located horizontally at the bottom of the vessel 132. It is perforated in a pattern similar to that shown in FIGURE 7 to receive the upper ends of sample lines 126. The holder vessel is preferably made of a neutron absorbing material, such as boron steel or the like, to minimize neutron activation of the filter elements.

Supported within vessel 132 and upon plate 188 is the filter element holder assembly consisting of lower plate 190, upper plate 192, central spindle 194, lift ring 196, and a plurality of filter element holder tubes 198 supported between the plates 190 and 192. These tubes, shown without filter elements in place, are arranged in a pattern around central spindle 196 as indicated in FIGURE 7, in which upper plate 192, the spindle, and the holder tubes 198 are also shown. Other patterns obviously can be substituted, if desired, to accommodate a greater or smaller number of filter elements. Fluid outlet 200 is provided opening from the upper part of vessel 132 by means of which the filtrate portion of the samples taken is removed and conducted via line 134 shown in FIGURE 3, to a low pressure sink to maintain the controlled flow of coolant sample.

Referring to FIGURE 8, a detailed vertical cross section is shown of the structure and contents of the filter element holder tube 198. Elements previously described are designated here by the same numbers. Filter element support ring 201 is fitted into the lower end of tube 198 and surrounds the upper end of the sampling tube 126. Seal 202, such as an O-ring, is provided at the lower end of each tube 198 to prevent sample mixing. A fluid-permeable filter element 204, capable of retaining particles as small as about 1.0 micron in average dimension is provided. It has a lower end fitting 206 tightly seated against ring 201 by means of loading spring 208, and an upper hold-down or retainer ring 210. The filter element in this example consists of a cylindrical fluid-permeable cup or tube closed at its upper end and fabricated of any suitable material such as stainless steel, aluminum, zirconium, nickel or other material in a form which is fluid permeable, which has pores of sufficiently small size to retain the small escaping particles, and which suitably resists corrosion in the reactor environment. Packed glass wool makes an effective filter. Particularly suitable are the permeable ceramics and sintered metal powders. Use of high-purity spectroscopic grade permeable graphite minimizes background radiation otherwise induced by neutron activation of the filter element when placed inside the reactor vessel as shown here. Specifically such elements as cobalt, copper, manganese, and other radially activated materials must be meticulously avoided for even as trace impurities in the filter, neutron activation will result in an undesirably high background activity. The sample flow is through line 126 into the interior of the filter element 204, through the permeable element wall to the annulus, and then the filtrate flows out through opening 212 in upper ring 210.

The modification of this invention described above and illustrated in FIGURES 3 through 8 is typical of its embodiment in a commercial scale boiling light water moderated and cooled nuclear reactor power generation system. The following data are given as illustrative of the structure and operation of such a system which liberates nuclear heat at the rate of 685 megawatts, and which generates electrical energy at a gross rate of 192 megawatts and at a net rate on the line of 180 megawatts.

The nuclear reactor vessel is 13 feet in diameter and 42 feet high, the reactor core consists of 488 square zirconium channels 3.75 inches by 3.75 inches on a side, 10 feet long, and containing 36 zirconium-clad $UO_2$ fuel rods about 0.56 inch in outside diameter in a 6 x 6 array. The $U^{235}$ enrichment is 1.5%. The total weight of $UO_2$ contained in the reactor core is about 66 tons. The coolant-moderator is light water circulated through the core at a rate of about $26 \times 10^6$ pounds per hour. The coolant is partially vaporized producing about $1.5 \times 10^6$ pounds per hour of saturated steam at 1000 p.s.i. The 488 sample line inlets are located in the sampling grid which covers the top of the core, the sample lines are segregated into four bundles of 122 lines each, and are connected into the four filter element holder vessels as shown in FIGURE 3. The filter elements are $Al_2O_3$ sleeves as shown in FIGURE 8, are approximately 3 inches long, ¾ inch inside diameter, ⅛ inch in wall thickness.

In normal operation the reactor run is continued for periods up to 180 days, at the end of which the reactor is shut down for routine maintenance. The vessel is opened, the filter elements are removed for monitoring, and scheduled refueling is done. If any anomalous radioactivity is detected, an actual or incipient rupture exists, and a new fuel assembly is substituted for the defective one. Such anomalous activity is that which is greater than the average of the other filter element activities. The detection of radiation levels between fixed limits, or the exclusion from detection of radiation levels above or below some fixed value, may be effected with conventional radiation detection instruments, amplifiers, and pulse analyzers which are commercially available. In this manner signals from traces of corrosion products, coolant activities, and other materials do not interfere with the desired signal from radioactive particles released from the defective fuel element.

Referring now to FIGURE 9, another embodiment of this invention is shown in which the sample filters are placed in the sampling grid rather than in a filter element holder vessel as in FIGURES 3, 4, and 6. Structural elements shown in FIGURE 9 which are the same as in FIGURES 5 and 8 are designated by the same numerals. In FIGURE 9 sampling grid 124 consisting of elements 164 and 166 includes filter holder tube 220 supported from the sampling grid by a support spider including elements 222. Filter element 204 is enclosed within the tube and sample flow is induced positively through openings 224, through the filter element, and out via upper fitting 210 and sample line 126. In order to minimize neutron activation of the filter element, the element is preferably fabricated of materials which are not readily activated, or have very short half-lived radioactive daughter products. Such materials as zirconium and aluminum, and certain of their alloys, and the like and which do not contain readily activatable impurities, such as cobalt, for example, are suitable. Further, holder tube 220 is preferably fabricated of a corrosion-resistant material which also acts as a neutron shield, such as boron-aluminum alloys, boron steels, cadmium-containing mixtures and alloys, and the like. The sample lines are utilized in this embodiment to carry sample filtrate to a common header or manifold maintained at a reduced pressure, and the sampling flow rate is controlled in the manner as shown in FIGURE 3.

Referring now to FIGURES 10 and 11, two additional types of filter elements are shown which may be employed in the present invention.

In FIGURE 10 sample line 126 is extended coaxially through holder vessel 230 provided with removable cap 232 and an annular type filter element 234. Sample line 126 is capped at its upper end at 236 and is provided with perforations 238 within element 234. Vent line 240 opens into vent manifold 242 in which the controlled low pressure is maintained. The caps 232 and 236 are removable permitting removal, monitoring, or replacement of filter element 234. Suitable filter materials include tightly packed wools of stainless steel, glass, graphite, or nickel and the like.

In FIGURE 11 sample line 126 with perforations 238 opens into a holder vessel 230 and is capped at 236. Also vent line 240 opens to a vent manifold 242 common to all such filter holders. Projecting radially outward from sample line 126 and inwardly from holder wall are support shelves 244 and 246 respectively on which is supported an annular-shaped filter element disc 248. The outer edge of disc 248 is turned up at 250 to permit stacking and automatic monitoring of a plurality of such discs in commercially available automatic monitoring devices. The sample flows through line 126 and perforations 238 downwardly through the disc and the filtrate is vented through line 240 and manifold 242. The disc may be a permeable ceramic or sintered powder of metal or other material.

Other types of filter elements can, from the foregoing disclosure, be adapted readily as embodiments of this invention by those skilled in the art.

Referring now to FIGURES 12 and 13, a cross section elevation and a plan view of another embodiment of this invention are illustrated respectively. This utilizes the flow of coolant in the fuel channel to generate the necessary pressure differentials required to filter a sample stream and requires no vent line opening through the reactor vessel wall. It is particularly well suited to natural circulation, boiling-liquid cooled reactors. In the drawings, fuel channel 260 is provided with an extension or chimney 262 which extends above the top 264 of the fuel or active zone. A streamlined filter holder 266 is supported centrally or otherwise in chimney 262 thereby forming a peripheral restricted or reduced cross sectional area 268 in the chimney open to coolant flow. Disposed coaxially in holder 266 and extending upwardly from a lower opening 270 is inlet tube 272 also open at its upper end 274 adjacent the other end of the holder. Disposed around the largest perimeter of holder 266 are several openings 276 which are disposed at a longitudinal position between the ends of tube 272. Filter element 278 is disposed within holder 266 between holder openings 276 and tube opening 274. The device is supported from grid 280 by means of support element 282.

In operation, the coolant flows upwardly past holder 266, through restricted area 268, and through grid 280, at some average operating pressure $P_a$. The inlet opening 270 receives a small sample of the current of coolant at a pressure $P_i$ which is equal to or slightly higher than $P_a$. The restricted area 268 constitutes the throat of an annular Venturi in which a substantially increased fluid velocity is generated, with a correspondingly reduced fluid pressure $P_o$, $P_o$ being less than $P_i$. The differential pressure $P_i-P_o$ is the driving force which moves the small coolant sample up through inlet tube 272 and through filter element 278 leaving on the element any small particulate solids escaping from a defective fuel element in the channel. Other modifications of this embodiment will occur to those skilled in the art based upon the Pitot and Venturi principles applied here. A suitable filter element is an annular-shaped plate of permeable ceramic or refractory such as aluminum oxide, or the permeable sintered metal materials referred to above.

Referring finally to FIGURE 14, an elevation view of a shielded scintillation spectrophotometer is shown applied to the measurement of the activity of filter elements of the type shown in FIGURES 12 and 13, but which is equally applicable to the monitoring of any of the other filter elements and whether in the grid, as in FIGURE 14, or in the holder vessel as in FIGURE 3, or individually. In FIGURE 14 fuel channel chimneys 262, filter element holder 266, filter element 278, grid 280, and support element 282 are shown as in FIGURE 12. The grid and filter element holder assembly may be removed from above the reactor core, or the monitor instrument may be introduced above the grid as indicated in FIGURE 14. This particular monitor consists of heavy shield 290 of lead provided with an inner space 292 containing scintillation crystal 294 such as sodium iodide, disposed adjacent a photomultiplier tube 296. These are well-known, commercially available components which operate in connection with electronic amplification, indicating, and recording equipment, also well known to those skilled in the art. The lower portion of shield 290 is provided with tip portion 298 provided with a plurality of downwardly converging openings 300 aligned with focal point 302, any convenient point on or near the filter element 278. Only radiation generated by radioactive fuel or fission product particles on filter element 278 in which focus 302 is located can reach the crystal 294. This permits the removal of the filter elements with the sampling grid and individual monitoring to be done without dismantling or replacing the individual holders. However, filters indicating high activity should be replaced along with the corresponding defective channel. Further, scintillation spectrometers are capable of being made responsive to alpha, beta, gamma, and neutron radiation having a particular energy spectrum which may be characteristic of a particular fission product or activated fuel component. It thus may be adjusted to respond to $Ba^{140}$ for example, and reject or be insensitive to radiation from various activated corrosion or erosion products, or activated coolant. This is a highly preferred system for detecting and measuring the presence of particulate matter on the filter elements according to this invention.

Other known means for detection and measurement of the various kinds of radiation from radioactive solids may be used in conjunction with this invention, including for example, gamma and beta radiation spectroscopy, mass spectrometry, flame and arc spectroscopy, fluophotometry, and others. Further, various chemical treatments of the filter may be used instead of or in conjunction with these various radiation detection systems. For example, in a reactor system where the structural corrosion and erosion product may be confused for the selected fission product activity, the material on the filter may be completely dissolved in an acid and the desired fission products separated by precipitation. For example, $Ba^{140}$ can be separated from the solution as barium sulphate.

A particular embodiment of this invention has been described in considerable detail by way of illustration. It should be understood that various other modifications and adaptations thereof may be made by those skilled in this particular art without departing from the spirit and scope of this invention as set forth in the following claims.

I claim:

1. A method for detecting the existence of and identifying a fuel channel containing a leaking fuel element in a nuclear reactor enclosed in a reactor pressure vessel and having a plurality of such channels, which method comprises the steps of maintaining within said vessel at a point spaced apart from said fuel channels a plurality of individual fluid-permeable solid filter elements equal in number to said plurality of channels, monitoring the radioactivity of the gross mixture of fluid from the fluid channels, maintaining a reverse flow of fluid throughout each of said filter elements into the fluid channels, terminating said reverse flow upon detection of predetermined activity of the gross mixture, withdrawing a sample of fluid effluent from each fuel channel prior to gross mixing of all such effluents, said samples containing any radioactive particles of fuel and fission products leaking from a defective fuel element, simultaneously passing at least part of each such sample separately through one of said plurality of filter elements to retain on a particular filter element at least part of the radioactive particles leaking from a defective fuel element in a particular channel, controlling the flow rate of the fluid samples in relation to the operating period of the reactor to avoid saturation of any of said filter elements with said radioactive particles, maintaining the sample flow for a period to deposit on at least one of said filter elements an anomalous radioactivity, subsequently terminating the operation of the reactor, removing said filter elements from said pressure vessel, and monitoring at a site remote from said reactor the radioactivity of each of said plurality of filter elements to determine the existence and identity of any fuel channel containing a leaking fuel element by an anomalously high radioactivity of the corresponding filter element.

2. An apparatus for identifying a fuel channel containing a leaking fuel element in a nuclear reactor enclosed in a reactor pressure vessel and which reactor contains a plurality of fuel channels through which a fluid is passed, which apparatus comprises means for separating a sample of said fluid disposed in fluid-receiving relation to the outlet of each of said fuel channels, an equal plurality of individual solid fluid-permeable filter elements removably disposed within said vessel, means for passing at least part of said sample from each of the sample separator means through a corresponding filter element to retain thereon at least part of any radioactive fuel and fission product particles leaking into said fluid, means for passing a reverse flow of fluid through said filter material into said fluid channel, and controller means responsive to the radioactivity of the gross cooling fluid from said fluid channels and connected to terminate said reverse flow and initiate the normal filtration flow, the defective fuel channel being indicated by an anomalously high radioactivity of the corresponding filter element.

3. An apparatus according to claim 2 in combination with means outside of said pressure vessel for controlling the flow rate of said samples to avoid saturation of any of said filter elements with said radioactive particles.

4. In a nuclear reactor apparatus comprising a pressure vessel, a nuclear chain reacting core disposed within said pressure vessel and having a plurality of coolant flow channels containing nuclear fuel elements, and means for passing a coolant fluid through said channels to remove heat therefrom, the improved apparatus for identifying a flow channel containing a leaking fuel element which comprises a sample separator grid disposed immediately adjacent the effluent end of said core, at least one filter element holder vessel supported adjacent said grid within said vessel, a plurality of individual filter element container tubes contained in said holder vessel, a solid fluid-permeable filter element contained in each of said tubes, a sample conduit communicating at its inlet end in said grid with the outlet of each of said fuel channels and at its outlet end with the inlet of one of said filter element container tubes, an outlet manifold communicating with a low pressure region and with the outlet end of each of said tubes, means for controlling the flow of fluid through the filter element holder vessel to retain on said filter elements the radioactive fuel and fission product particles leaking from a defective fuel element into the coolant flow through one of said flow channels, controller means responsive to the radioactivity of the gross recirculating coolant, and means maintaining a reverse flow of a fluid through said filter elements into the fuel channels, said controller being connected to terminate the reverse flow and initiate normal sample flow from the fuel channels through the filter elements upon detection of a predetermined gross coolant radioactivity whereby the anomalously high radioactivity of a particular filter element identifies the corresponding channel containing the leaking fuel element.

5. An apparatus according to claim 4 wherein said outlet manifold opens through the wall of said pressure vessel and communicates with a low pressure point in the coolant recirculation system.

References Cited in the file of this patent

UNITED STATES PATENTS

| 2,016,161 | Wilderman | Oct. 1, 1935 |
| 2,807,580 | Fenning et al. | Sept. 24, 1957 |
| 2,823,179 | Snell et al. | Feb. 11, 1958 |

FOREIGN PATENTS

| 216,226 | Australia | July 22, 1958 |

OTHER REFERENCES

Labeyrie et al.: International Conference on the Peaceful Uses of Atomic Energy, volume 3, pages 86–90, August 1955.